United States Patent [19]

Sancken et al.

[11] 4,321,996

[45] Mar. 30, 1982

[54] CLEATED BELT FORAGE CONVEYOR

[75] Inventors: Ernest H. Sancken; Charlie R. Silverthorn, both of Eureka, Ill.

[73] Assignee: A. O. Smith Harvestore Products, Inc., Arlington Heights, Ill.

[21] Appl. No.: 185,213

[22] Filed: Sep. 8, 1980

Related U.S. Application Data

[63] Continuation of Ser. No. 37,739, May 10, 1979, abandoned.

[51] Int. Cl.³ .................... B65G 45/00; B65G 15/42
[52] U.S. Cl. .................................. 198/499; 198/688; 198/821; 198/836
[58] Field of Search .............. 198/688, 861, 699, 716, 198/836, 499, 498, 635, 637, 819, 823–830, 720, 735, 580, 821, 720; 414/327, 528

[56] References Cited

U.S. PATENT DOCUMENTS 2,635,735  4/1953  Smith ................................... 198/836
3,750,861  8/1973  Holtsclaw et al. ............. 198/720 X
4,162,727  7/1979  Summers ............................. 198/688

Primary Examiner—Robert B. Reeves
Assistant Examiner—Douglas D. Watts
Attorney, Agent, or Firm—Andrus, Sceales, Starke & Sawall

[57] ABSTRACT

The cleated belt forage conveyor of the invention is directed to a forage belt conveyor in which the belt in service is protected against side discharge of conveyed forage by upstanding and intermittent central cleats and outwardly spaced side cleats. Sealing strips extend above the belt in the spaces between the respective central and side cleats to limit outward movement of the bulk of the forage and an edging extends on each side of the belt to prevent spillover. In the event of some side discharge from the belt to the inside of the lower reach of the belt, a plow overlying the inside of the lower reach of the belt directs the forage for discharge to vibrating deflector plates which deflect the forage to the bottom of the housing of the conveyor to be carried by the cleats to the input side of the conveyor and around the idler pulley for reconveyance. Any throw off of forage by the idler pulley is caught by vibrating catch pans which carry the discharge forage to the bottom of the conveyor to be moved again toward the input side of the conveyor.

9 Claims, 9 Drawing Figures

CLEATED BELT FORAGE CONVEYOR

This is a continuation of application Ser. No. 037,739, filed May 10, 1979, now abandoned.

BACKGROUND OF THE INVENTION

The belt and trough design of the invention employing a cleated belt conveyor evolved from problems of buildup of forage on the edges and corners of the belt conveyor as well as on the belt supports. Intermittent cleats on the belt along with sealing strips and edging limit side discharge of forage from the belt. In the event of any side discharge a combination of a plow and vibrating deflector plates and catch pans return the discharged forage to a position in which it can be reconveyed for proper end discharge.

SUMMARY OF THE INVENTION

The invention is directed to a belt conveyor constructed to overcome the problem of side discharge of forage when the belt is rotating in service.

Horizontally extending central upstanding cleats are intermittently secured along the length of the belt to engage and carry the forage forward. The central cleats are aided by side cleats which are spaced slightly outwardly of the central cleats. Sealing strips are located in the respective spaces between the central and side cleats and slightly above the belt to prevent the bulk of the forage from moving to the edge of the belt. Forage leaking under the sealing strips is caught and conveyed forwardly by the outer side cleats. A generally high edging also extends along each side of the length of the conveyor belt and thus between the side cleats to additionally prevent spillover of forage.

Forage which may leak over the edging falls to the inside of the return reach of the belt. There it is plowed off at the input end of the forage conveyor by a plow and diverted to the cleat side of the belt by vibrating deflector plates. The cleats then carry the forage on the belt back around an idler pulley to the top of the conveyor to again be conveyed to discharge by the belt. Any forage which may be thrown off by the idler pulley is caught by upwardly sloping catch pans and conveyed to the bottom of the forage conveyor for engagement by the cleats on the belt for reconveyance.

BRIEF DESCRIPTION OF THE DRAWINGS

FIG. 2 is a side view of the conveyor with parts broken away;

DESCRIPTION OF THE PREFERRED ILLUSTRATED EMBODIMENT

Figure 1:
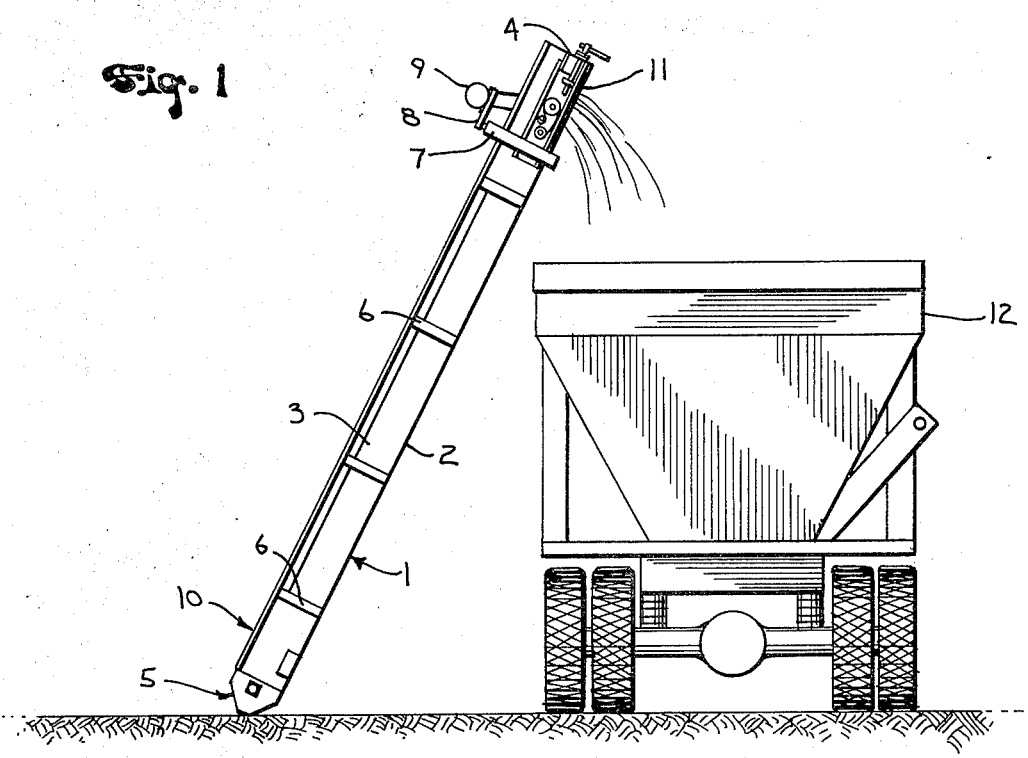
FIG. 1 is a side elevational view illustrating the conveyor loading forage into a storage structure.
Figure 3:
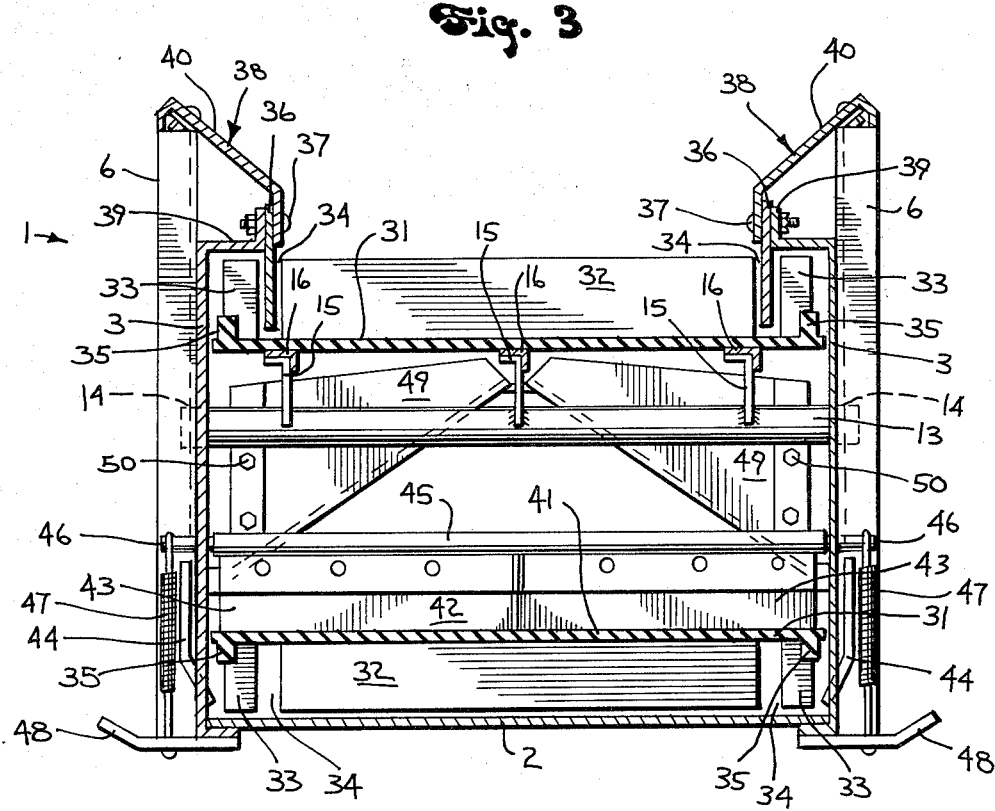
FIG. 3 is a section taken on line 3—3 of FIG. 2 illustrating the catch pan and plow of the invention.
Figure 4:
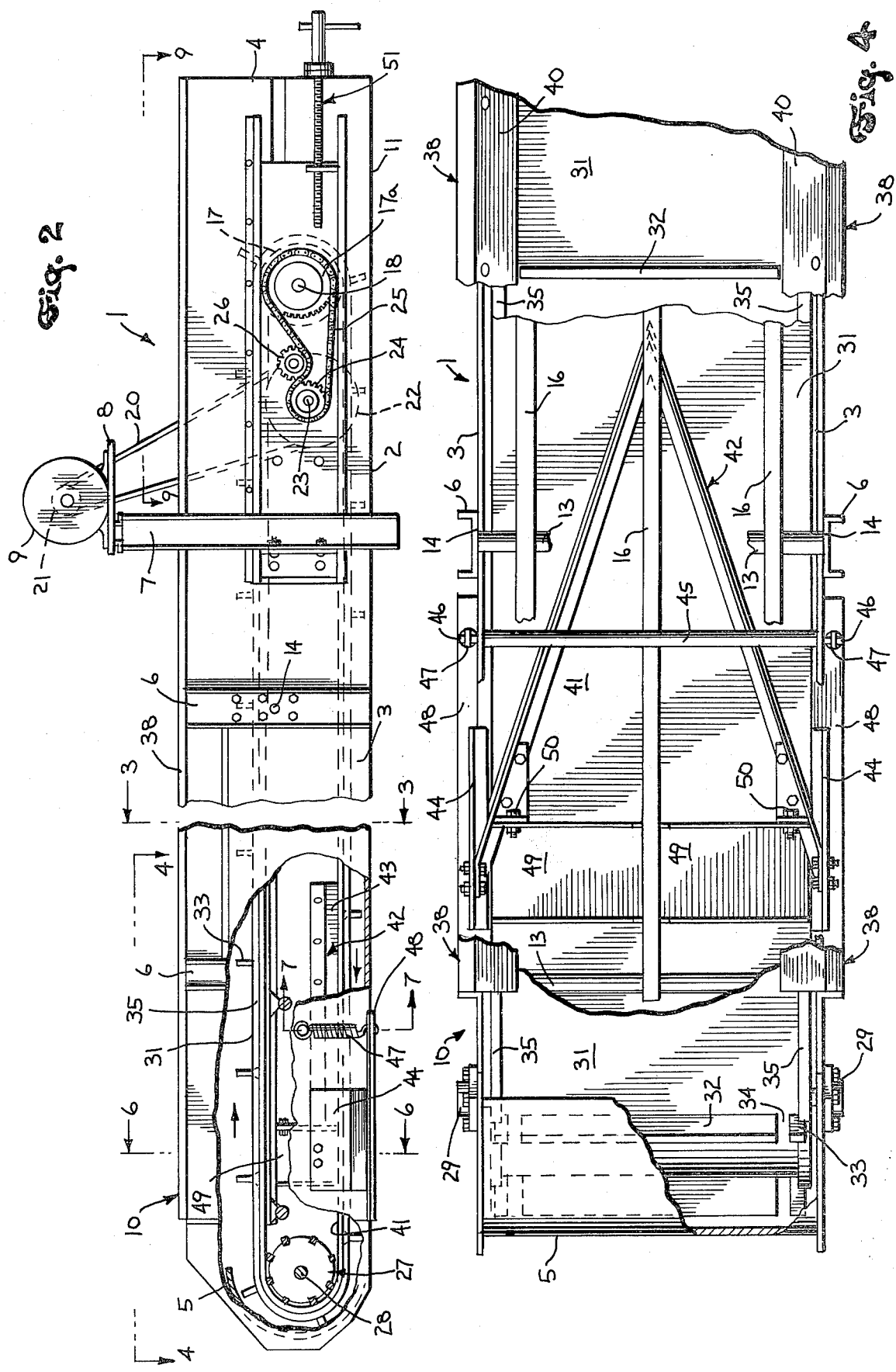
FIG. 4 is a top plan view taken on line 4—4 of FIG. 2 at one end of the conveyor with parts broken away and showing a portion of the housing with the top of the housing and the belt removed and illustrating the plow, catch pan and the pulley construction.
Figure 5:
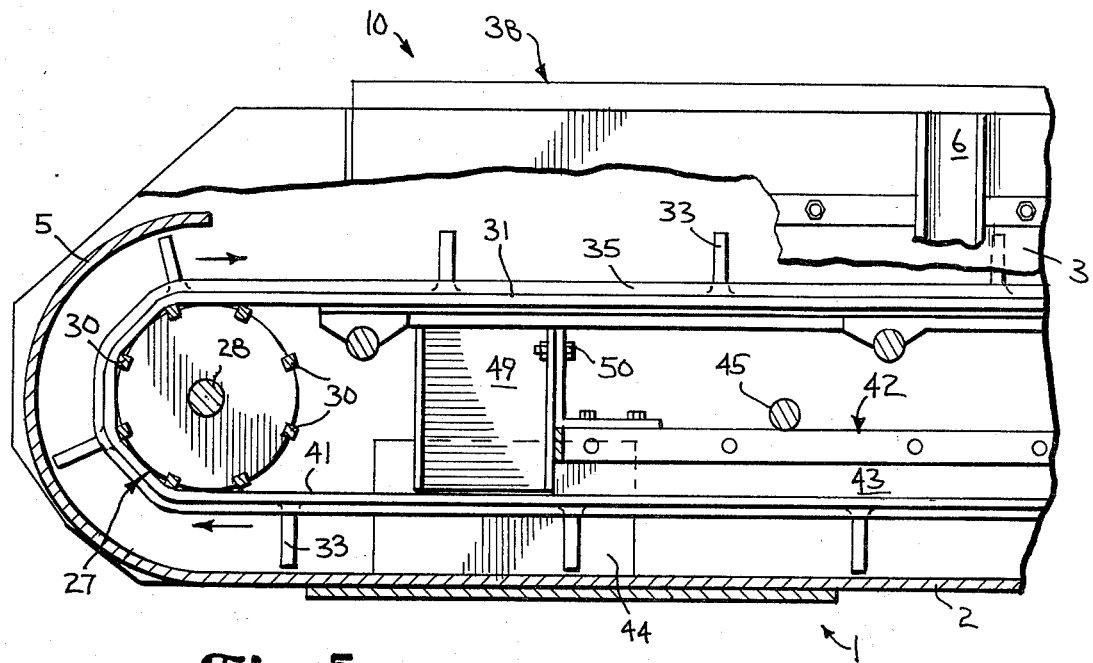
FIG. 5 is an enlarged side view of the input end of the conveyor with parts broken away.
Figure 6:
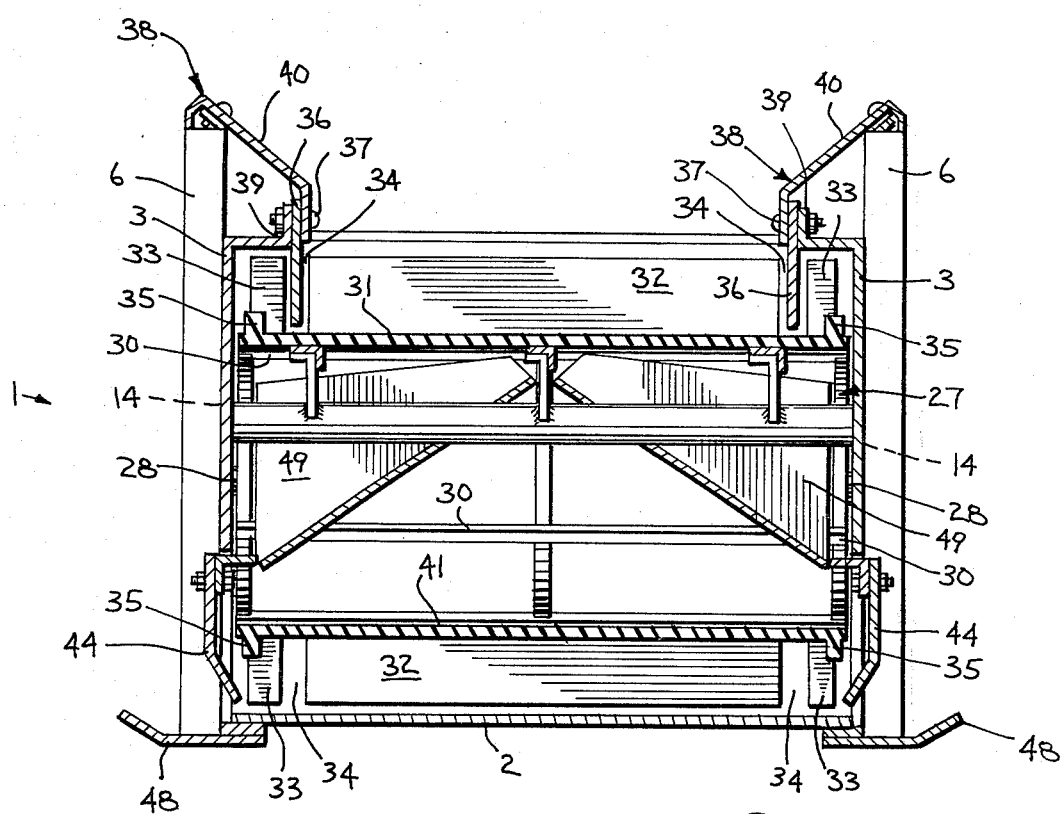
FIG. 6 is a sectional view taken on line 6—6 of FIG. 2.
Figure 7:
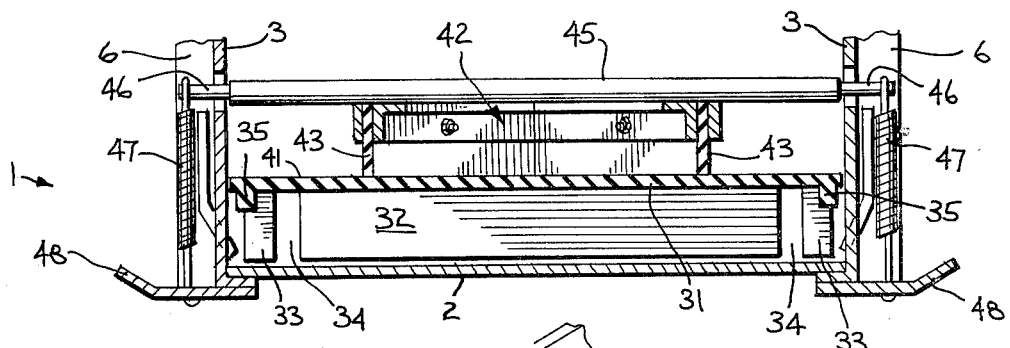
FIG. 7 is a section taken on line 7—7 of FIG. 2 illustrating the method by which the plow is held against the belt.

Referring to the drawings the belt forage conveyor of the invention has an elongated metal housing 1 which is made up of sections so a forage conveyor can be readily constructed of various lengths.

Housing 1 has a bottom 2, laterally spaced side walls 3 and is closed at the discharge end by end wall 4 and at the input end by a pulley housing 5. Housing 1 is reinforced by vertically extending longitudinally spaced metal braces 6 towards the input end of housing 1 and a second brace 7 is located towards the discharge end of housing 1. Brace 7 extends upwardly and over the open upper part of housing 1. A platform 8 is bolted to one side of brace 7 and supports the electric drive motor 9. Additional braces, not shown, are employed if additional sections are added to housing 1.

Housing 1 has an input end 10 into which is loaded forage or the like for movement through the conveyor. The discharge end of housing 1 has a downwardly formed opening 11 through which forage or the like is discharged such as into a storage structure 12 as illustrated in FIG. 1.

The walls 3 of housing 1 are braced on the inside by a plurality of longitudinally spaced cross tubes 13 which are secured at each end as at 14 to vertically extending metal braces 6. The upright members 15 for the longitudinally extending rails 16 are welded to tubes 13 and are horizontally spaced to provide the center upright support member 15 and two outer upright support members 15 on each tube 13.

Support members 15 have a flat upper surface so that rails 16 can be secured thereto. This provides three horizontally spaced rails 16 which extend longitudinally of housing 1 and terminate at each respective end inwardly removed from the end wall 4 and pulley housing 5.

The inside of the housing 1 has a lagged drive pulley 17 lodged at the discharge end of housing 1 along with a large sprocket 17a on a rotatable shaft 18 which is supported in bearings 19 secured to each side of housing 1. Drive pulley 17 is driven through sprocket 17a and shaft 18 from drive motor 9 by a drive assembly consisting of V-belts 20 which engage a pulley 21 on the motor and a generally large pulley 22 on jack shaft 23. Jack shaft 23 is supported in bearings supported in housing 1 and extends horizontally through housing 1. Jack shaft 23 is connected by a shaft to a small sprocket 24 in turn connected to the sprocket 17a by an endless chain 25. Endless chain 25 passes under a small idler sprocket 26 having a shaft supported in housing 1.

At the input end of housing 1 a generally large idler pulley 27 is supported on a horizontally extending shaft 28 lodged in bearings 29 at each end within the pulley housing 5. Pulley 27 is provided with a plurality of spaced rods 30 so that the material being conveyed may pass through the pulley if necessary.

A conveyor belt 31 encircles drive pulley 17 and idler pulley 27 and in service is driven towards the discharge end of housing 1 and then returns over bottom 2 of the forage conveyor beneath tubes 13 and rails 16 which support the upper run of conveyor belt 31.

In order to eliminate any substantial side discharge of the forage material carried by the upper run of belt 31 when it is rotating, several constructions are provided.

Figure 8:
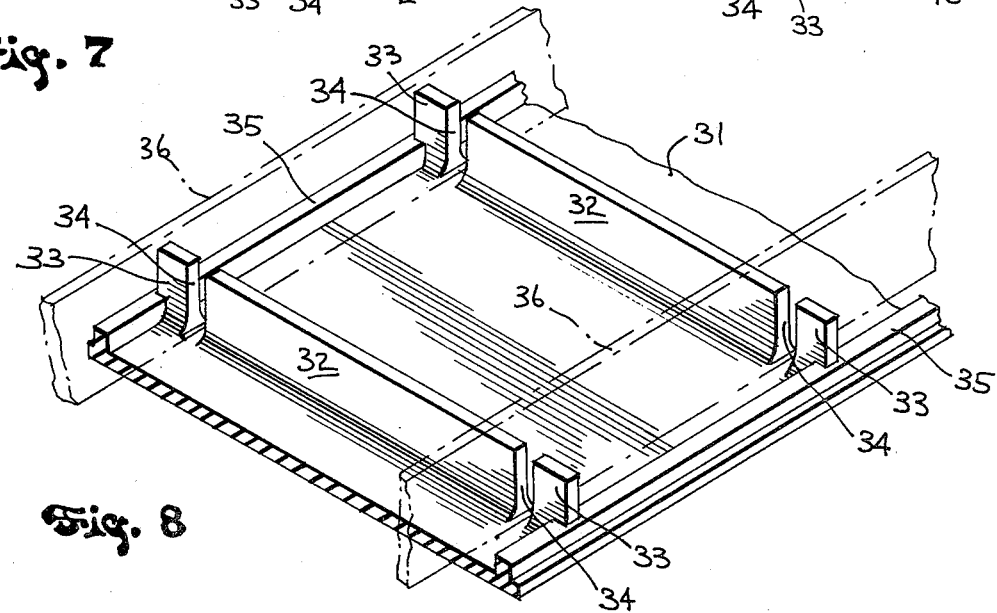
FIG. 8 is a perspective view of part of the top of the belt.
Figure 9:
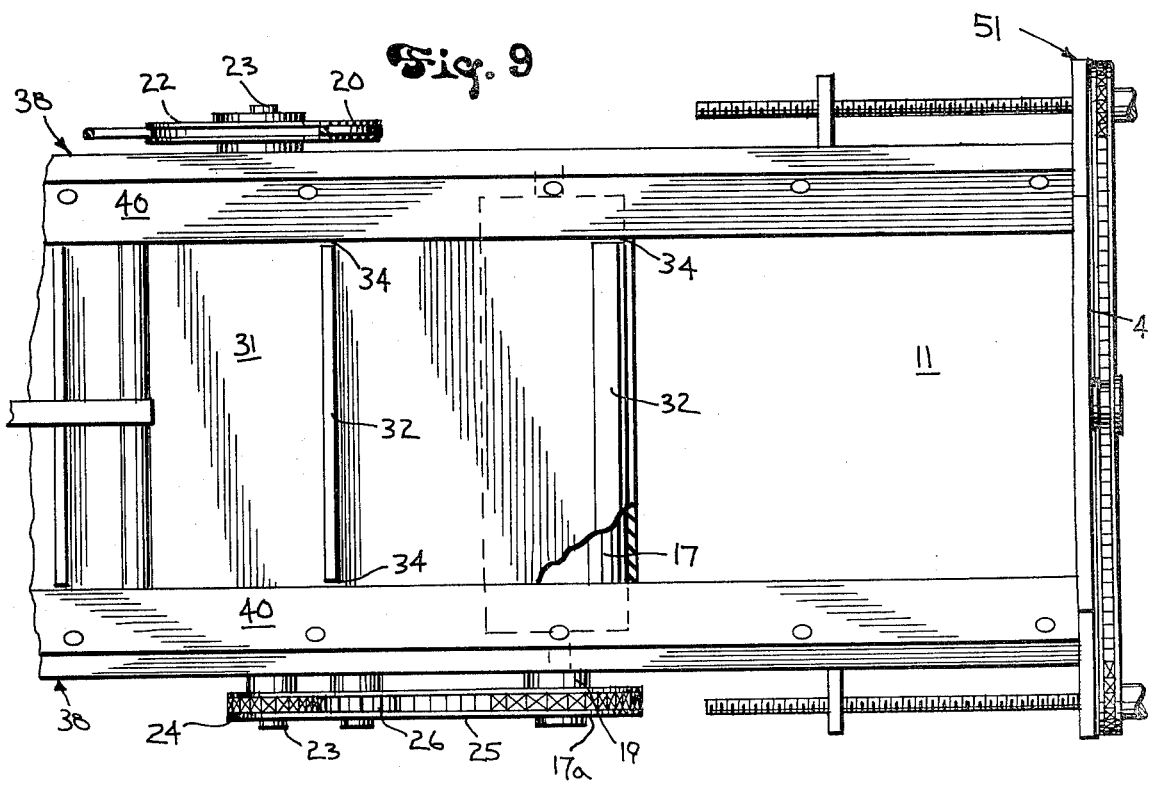
FIG. 9 is a top view of the discharge end of the conveyor taken on line 9—9 of FIG. 2.

As particularly illustrated in FIG. 8, belt 31 is provided with generally central upstanding elongated cleats 32 of rubber or like material which are spaced intermittently longitudinally of belt 31 and extend horizontally across the greater width of belt 31. The cleating arrangement is completed by upstanding side cleats 33 of material corresponding to cleats 32 and which are spaced outwardly of the central cleats 32 to provide spaces 34 therebetween. In addition the respective edges of belt 31 are provided with an edging 35 which are formed around the intermittent side cleats 33 and extend throughout the length of belt 31.

In addition the sealing plates or strips 36 are secured by bolts 37 on opposite sides of the conveyor belt 31 to the fenders 38 which extend upwardly from the flanged upper ends 39 of side walls 3. The upper end portions 40 of fenders 38 flare outwardly to provide a hopper-like configuration. Bolts 37 also extend through the upper end portions 39 of side walls 3 of housing 1.

Sealing strips 36 extend the length of conveyor belt 31 and project downwardly within the respective spaces 34 provided between the central cleats 32 and side cleats 33. Sealing strips 36 are positioned approximately 1/16-¼ of an inch above conveyor belt 31 to prevent the bulk of the forage on the belt conveyor from moving outwardly of belt 31 and are adjustable with respect to their location above conveyor belt 31. Forage leaking under sealing strips 36 is caught by the outer or side cleats 33 or by the generally high edging 35 on belt 31 and conveyed forwardly to discharge by belt 31. Side cleats 30 and edging 35 thus cooperate with sealing strips 36 to maintain most of the conveyed forage on conveyor belt 31 and to convey the forage to the discharge end of the forge conveyor.

The conveyor of the invention is also provided with an additional construction to handle forage which may spill off the side of belt conveyor 31 and tend to accumulate on the on the upper side 41 of the lower reach of belt 31 which is opposite to the cleats 32 and 33.

In order to divert the accumulated forage off from the upper side 41 of the lower reach of belt 31, the forage conveyor is provided at the input end with a plow 42 which overlies the lower reach of belt 31. Plow 42 is of a triangular shape with the generally pointed end engaging the forage as it is moved by belt 31 and the sides of plow 42 are provided with the depending blades 43 of material of rubber or the like which are secured to the respective plow sides.

Deflector plates 44 are bolted at each side at the rear to the plow 42 so that when the blades 43 of plow 42 guide the forage rearwardly the forage engages deflector plates 44 and is diverted to the bottom 2 of housing 1 where it is engaged by cleats 31 and 32 on the then underside of belt 31 and pushed to the input end of the belt conveyor.

Plow 42 is free for slight vibrating vertical movement with respect to belt 31 which results from its contact with the moving belt. The upward movement is restricted by a bar 45 which extends horizontally across the top of plow 42. Each outer end 46 of bar 45 is engaged by a coil spring 47 which secures bar 45 to the respective side plates 48 in turn secured to the bottom 2 of housing 1. Coil springs 47 permit vertical movement of bar 45 above plow 42 to permit a similar movement of plow 45. Slight vibration of the plow results from its normal contact with belt 3. Being bolted to the plow the deflector plates are also caused to vibrate slightly. Forage moving off belt 31 by plow 42 is returned by deflector plates 44 to bottom 2 of housing 1. The vibrating action of the deflector plates assists the plates in returning the forage.

Cleats 31 and 32 carry the forage to and around the idler pulley 27 at the input end of the forage conveyor for transfer to the then top of belt 31 and conveyance to the discharge end of the forage conveyor.

However, forage escaping under the plow (as some will always do) will pass into idler pulley 27, and be thrown off at the top immediately ahead of the pulley. Provision is made to catch this discharge of forage and convey it to the bottom 2 of housing 1. This construction consists of a pair of catch pans 49 which slope downwardly and are secured by bolts 50 to each side to plow 42 and deflector plates 44 and slope upwardly from plow 42 and deflector plates 44. Catch pans 49 are also vibrated by the vibrations of plow 42 and deflector plates 44 and such vibration is essential in the proper operation of the catch pans.

A chain or belt tightening assembly 51 may be provided at the discharge end of the forage conveyor in the event it is necessary to effect tightening of the parts of the drive portion of the forage conveyor.

The present invention limits the problem of discharge of forage off the sides of a moving conveyor belt and in the event of discharge returns the discharged forage from the bottom of the housing of the forage conveyor to the top reach of the belt for reconveyance. The upright middle and end cleats cooperate with seal plates and outer edging to accomplish the limitation of the discharge of forage from the belt. Likewise a plow, deflector plates and catch pans cooperate to discharge any forage leaking off the belt to the bottom of the housing for return to the input side of the forage conveyor. The end cleats are particularly effective in cleaning the bottom or pan of the housing.

Various modes of carrying out the invention are contemplated as being within the scope of the following claims particularly pointing out and distinctly claiming the subject matter which is regarded as the invention.

We claim:

1. A forage conveyor which comprises a housing having input and discharge ends formed by end members, side members and a bottom member, an endless belt supported for travel between the input and discharge ends of the housing in a conveying run and a return run, said belt having an outer conveying surface and an inner surface, means to drive the belt, a plurality of cleats disposed in spaced relation on the outer surface of said belt and extending transversly across the belt to carry the forage from the input end to the discharge end of the housing, a vibrating plow disposed adjacent the housing and disposed to engage any forage on the inner surface of the return run of the belt which may have been discharged from the side of the conveying run of the belt, and vibrating deflector plates secured to the rear of the plow which vibrate as a result of movement transmitted to the plow by the moving belt and acting to divert forage directed to the plates by the plow to the bottom of the housing for engagement by the cleats and reconveyance to the input end of the housing.

2. The forage conveyor of claim 1, and the means to support the belt for travel including a pulley at the input end of the housing over which the belt rides, and catch pans secured to the rear and opposite sides of the plow and sloping upwardly in front of the pulley to catch any forage thrown forwardly by the pulley as a result of such forage escaping under the plow previously and not being eliminated by the plow and directing this forage to the deflector plates which in turn convey the forage to the bottom of the housing for reconveyance by the cleats.

3. A forage conveyor for conveying forage, comprising a housing having spaced side members and a bottom, an endless belt disposed to travel in the housing between the input and discharge ends of the housing in a conveying run and a return run, said belt having an outer conveying surface and an inner surface, drive means to drive the belt, a plurality of spaced upstanding central cleats disposed on the outer surface of the belt and extending generally transversely of the belt, an end cleat spaced laterally from each end of the central cleats to provide a slot therebetween, a sealing strip secured to each side member of the housing and projecting into the respective slot and having an edge disposed in proximate relation to the outer surface of the belt to prevent the bulk of forage from moving to the side edges of the belt, forage leaking under said sealing strips being caught by the end cleats and conveyed toward the discharge end of the housing, and an edge member secured to each side edge of the belt and extending longitudinally of the belt between adjacent end cleats to minimize discharge of forage from the side edges of the belt, and a plow disposed adjacent the input end of the housing and having a diagonally extending surface disposed to engage and remove any forage on the inner surface of the return run of the belt which may have been discharged from the sides of the conveying run of the belt.

4. The forage conveyor of claim 3, and including a vibrating deflector plate at the rear of the diagonal surface of the plow and disposed to divert forage to the bottom of the housing for engagement by the cleats in the return run of the belt and reconveyance to the input end of the housing, and a catch pan secured to the rear of the plow and sloping upwardly to catch any forage thrown forwardly by the drive means and direct said forage to the deflector plate which in turn diverts the forage to the bottom of the housing for reconveyance by the cleats.

5. A forage conveyor, comprising a supporting structure, an endless flexible belt mounted for endless travel on said supporting structure in a conveying run and a return run, said belt having an outer conveying surface and an inner surface, drive means for driving the belt, a plurality of cleats extending outwardly in spaced relation from the outer surface of said belt and disposed transversely of the belt, the end portions of each cleat being formed with a slot disposed generally normal to the belt and spaced from the respective end of the cleat to divide said cleat into a central section and a pair of end sections, the central sections and the end sections extending a substantial distance outwardly from the outer surface of the belt, a pair of sealing strips carried by the supporting structure and extending longitudinally of the belt, each strip having an extremity disposed generally normal to the conveying run of the belt and being received within aligned slots along the corresponding edge of the belt, and an edge member integral with on the outer surface of the belt and disposed at each side edge of the belt, said edge members extending longitudinally and interconnecting adjacent end sections of the cleats to minimize discharge of forage from the side edges of the belt.

6. The forage conveyor of claim 5, wherein the height of the central section of each cleat is substantially equal to the height of the end sections of the cleats.

7. The conveyor of claim 5, wherein the height of the edge members is substantially less than the height of the cleat sections.

8. A forge conveyor, comprising a supporting structure having a feed end and a discharge end, an endless conveyor belt, means for supporting the belt in endless travel on the supporting structure in a conveying run and a return run, said belt having an outer conveying surface and an inner surface, drive means for driving the belt in endless travel, a plurality of flexible central cleats formed integrally with the belt and extending outwardly from said outer surface, said cleats being spaced longitudinally of the belt and extending transversely across the belt, an end cleat spaced laterally from each end of each central cleats to provide slots therebetween at each side of the belt, the slots at each side of the belt being longitudinally aligned, the central cleats and end cleats extending a substantial distance outwardly from the outer surface of the belt, and a sealing strip carried by the supporting structure and received within the aligned slots along each side of the belt, the free edge of each sealing strip being disposed adjacent the outer surface of the belt, said sealing strips and said slots cooperating to minimize the discharge of forage from the sides of the belt, said supporting structure including a generally flat bottom surface disposed beneath and generally parallel to the return run of the belt, the outer edges of the cleats in the return run being disposed in proximate relation to said bottom surface whereby the cleats will convey any forage on said bottom surface to the feed end, and means disposed at said feed end for returning the forage being conveyed on said bottom surface to said conveying run.

9. A forage conveyor, comprising a supporting structure having a pair of spaced side walls, an endless flexible belt mounted for endless travel on said supporting structure and having a conveying run and a return run, said belt having an outer conveying surface and an inner surface, drive means for driving the belt in endless travel, a plurality of cleats extending outwardly in spaced relation from the outer surface of the belt and disposed transversely of the belt, the end portions of each cleat being formed with a slot disposed generally normal to the belt and spaced from the respective end of the cleat to divide the cleat into a central section and a pair of end sections, the central sections and the end sections extending a substantial distance outwardly from the outer surface of the belt, belt support means connected to the supporting structure for supporting the conveying run of the belt, said belt support means being spaced from the respective side walls to provide a clearance therebetween, the side edges of the belt being spaced from said side walls to provide a passage adjacent each side wall that communicates with the respective clearance, a pair of strips carried by the supporting structure and extending longitudinally of the belt and disposed above the conveying run, each strip having an extremity disposed generally normal to the conveying run of the belt and being received within aligned slots along the corresponding edge of the belt, an edge member disposed on the outer surface of the belt at each side edge of the belt, said edge members extending longitudinally between adjacent end sections of the cleats to minimize discharge of forage from the side edges of the belt, said supporting structure also including a generally flat bottom surface disposed beneath and generally parallel to the return run of the belt, the outer edges of the cleats in the return run being disposed in proximate relation to said bottom surface, any forage leaking past said edge members passing through said passages and said clearances and being collected on said bottom surface, the cleats in the return run conveying any forage on said bottom surface toward the end of the conveyor.

* * * * *

UNITED STATES PATENT AND TRADEMARK OFFICE
CERTIFICATE OF CORRECTION

PATENT NO. : 4,321,996

DATED : March 30, 1982

INVENTOR(S) : ERNEST H. SANCKEN and CHARLES R. SILVERTHORN

It is certified that error appears in the above-identified patent and that said Letters Patent is hereby corrected as shown below:

Col. 5, line 59, CLAIM 5, After "with" delete ---on---.

Signed and Sealed this

Sixteenth Day of November 1982

[SEAL]

Attest:

Attesting Officer

GERALD J. MOSSINGHOFF

Commissioner of Patents and Trademarks